No. 867,829. PATENTED OCT. 8, 1907.
D. McIVOR.
THRESHING MACHINE FEEDER.
APPLICATION FILED MAR. 14, 1906.
2 SHEETS—SHEET 1.
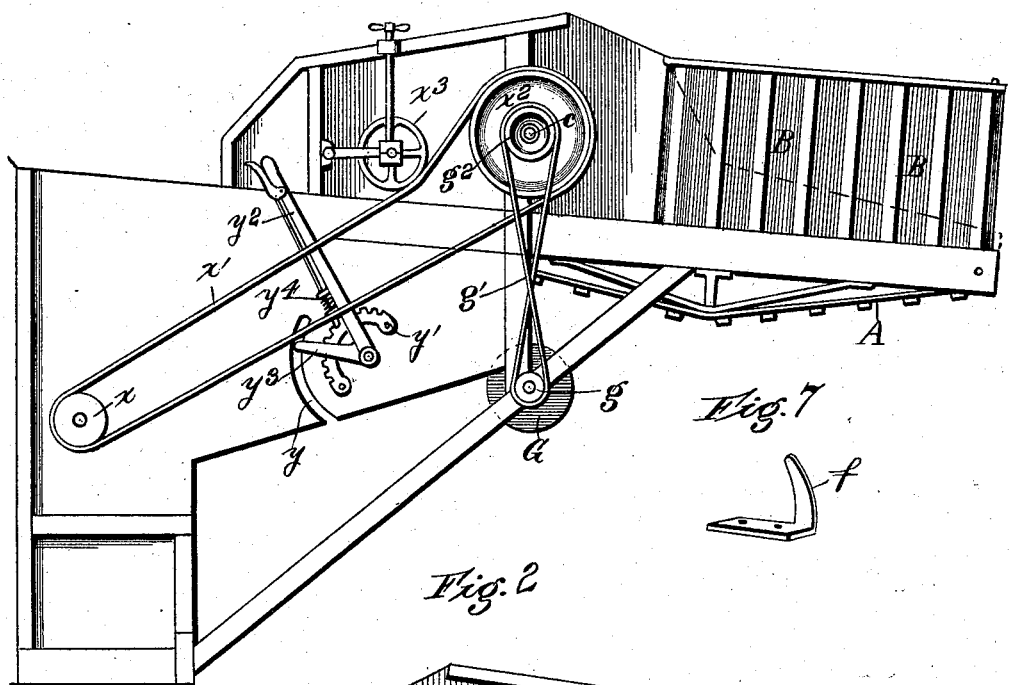
Fig. 1
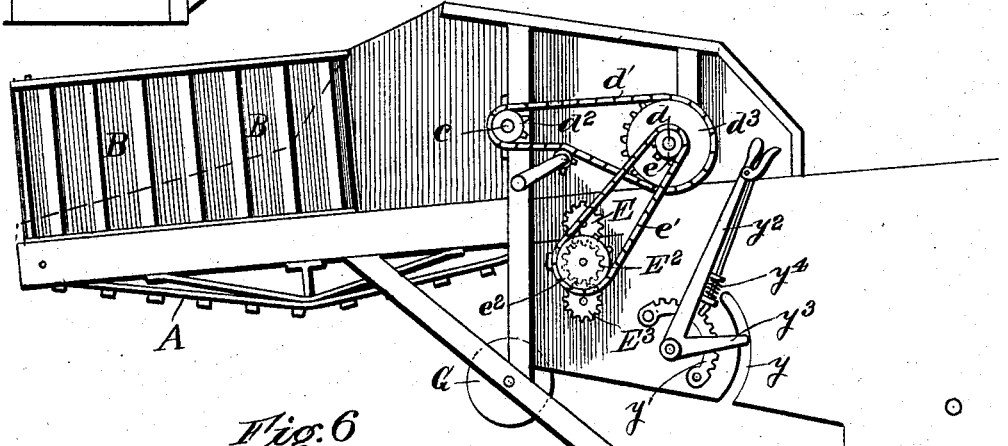
Fig. 2
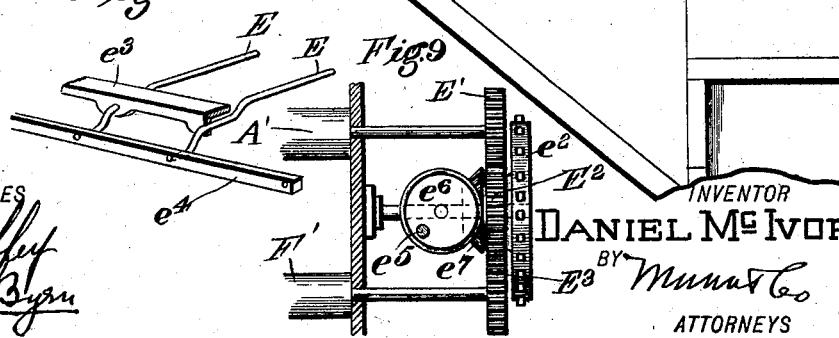
WITNESSES
INVENTOR
DANIEL McIVOR
BY
ATTORNEYS No. 867,829. PATENTED OCT. 8, 1907.
D. McIVOR.
THRESHING MACHINE FEEDER.
APPLICATION FILED MAR. 14, 1906.
2 SHEETS—SHEET 2.
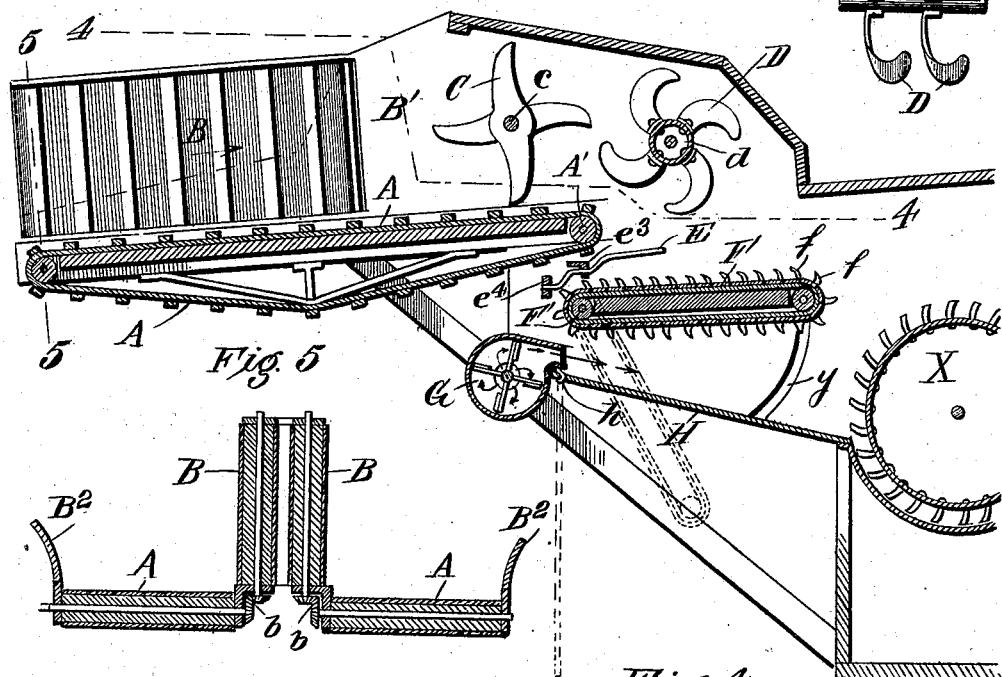
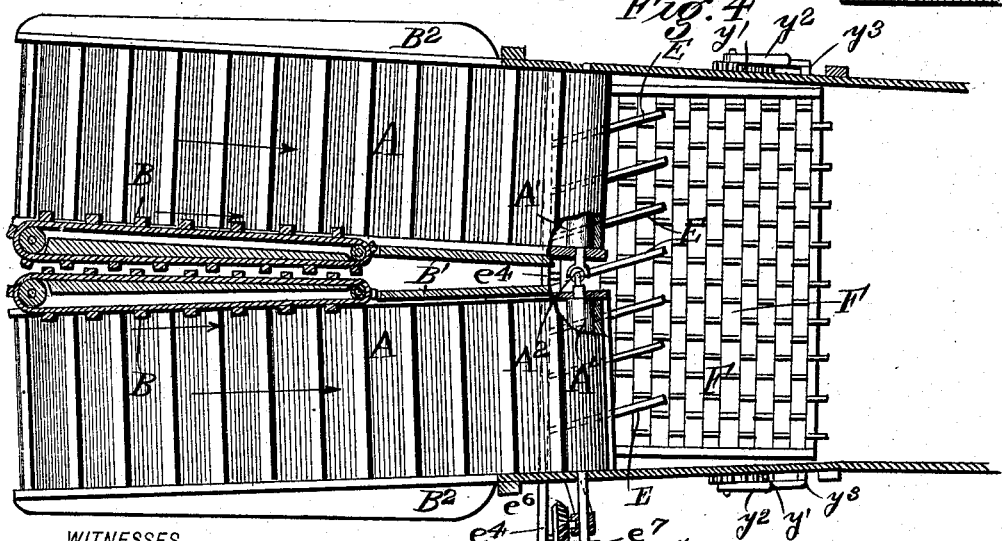
WITNESSES
INVENTOR
DANIEL McIVOR
BY
ATTORNEYS

UNITED STATES PATENT OFFICE.

DANIEL McIVOR, OF CROOKSTON, MINNESOTA.

THRESHING-MACHINE FEEDER.

No. 867,829.

Specification of Letters Patent.

Patented Oct. 8, 1907.

Application filed March 14, 1906. Serial No. 306,052.

*To all whom it may concern:*

Be it known that I, DANIEL McIVOR, a citizen of the United States, residing at Crookston, in the county of Polk and State of Minnesota, have invented a new and useful Improvement in Threshing-Machine Feeders, of which the following is a specification.

My invention is in the nature of an improved device for feeding the bundles of grain to a threshing machine, and it consists in novel means for facilitating the feed and for cutting the same and loosening up of the bundles and for cutting the same and loosening up and uniformly feeding the same to the threshing cylinder as hereinafter fully described with reference to the drawing, in which Figure 1 is a side elevation from one side and Fig. 2 is a side elevation from the opposite side. Fig. 3 a vertical longitudinal section. Fig. 4 is a horizontal section on line 4—4 of Fig. 3. Fig. 5 is a vertical section on line 5—5 of Fig. 3. Fig. 6 is a perspective view showing a portion of the straw loosening fingers. Fig. 7 is a detail of one of the retarding blades. Fig. 8 is a detail of the spreader and Fig. 9 a detail of driving gears.

Referring to Figs. 3, 4 and 5, A A are two endless carrier belts which are arranged nearly horizontal and feed the bundles of grain toward the threshing cylinder X. These carrier belts are constructed as usual in the form of slatted aprons traveling around rollers at the ends. They are arranged at an angle some distance apart at their outer ends as seen in Fig. 4 and converge toward the threshing cylinder until they are close to each other.

B B are two other slatted aprons or endless belts which are arranged in vertical planes along the inner edges of the carrier belts A A at the outer half thereof and from the inner ends of the upright aprons, stationary vertical boards B' Fig. 4, extend the balance of the length of the main carrier belts A A. These upright aprons are driven, see Fig. 5, by bevel gears $b$ $b$ connecting the outer rollers of the horizontal belts A with the outer rollers of the upright aprons B.

Relatively low flanges or side boards $B^2$ $B^2$ are arranged along the outer edges of the main carrier belts A A. The bundles of grain are thrown on to carrier belts A on both sides of the machine, passing over the side flanges $B^2$ and falling upon the carrier belts A A and lodging against the upright aprons B B and as these latter are positively driven in the same direction with the carrier belts A it will be seen that the bundles do not hang back but are quickly carried forward by the combined travel of belts A and upright aprons B. As the bundles of grain are carried toward the threshing cylinder the bands are first cut by a rotary band cutter C, Fig. 3, then the cut bundles are spread open by a spreader D acting on top of the same. A horizontal series of loosening fingers E, project from below the carrier belts and catch the bundles as they fall over the ends of the carrier belts and by a horizontal and laterally oscillating movement loosen up the straw and then allow this loosened straw to fall on a retarder apron F, which runs at a relatively slower speed, and allows the straw to accumulate thereon in a uniformly thick mass which is gradually discharged over the outer edge of the threshing cylinder X, and as the latter receives a very uniform feed the cylinder is not allowed to either speed or choke.

I will now describe the special construction and means for operating these several features of my feeder.

There is a rotary cutter C, Fig. 3, for each carrier belt A and these cutters are on a common shaft $c$ which, see Fig. 1, has outside the casing a band pulley $x^2$ connected by a belt $x'$ with a pulley $x$ on the end of the threshing cylinder, a belt tightener $x^3$ serving to keep belt $x'$ taut.

The rotary spreader D, Fig. 3, consists of a series of hook shaped blades set around a shaft $d$, the blades being offset alternately in opposite directions as seen in Fig. 8, so that as they rotate they will spread or separate the straws laterally from each other. This spreader is driven by extending its shaft $d$ through the casing and providing it, see Fig. 2, with a rigidly attached sprocket wheel $d^3$ which is connected by a chain belt $d'$ with a smaller sprocket wheel $d^2$ on the end of the cutter shaft $c$. On the same end of the spreader shaft $d$ with large sprocket $d^3$, see Fig. 2, is a small sprocket $e$ which through chain belt $e'$ turns a sprocket $e$ and this sprocket operates three parts, viz.: the carrier belt A, the loosening fingers E and the retarder apron F as will be presently described.

The loosening fingers E, see Figs. 3, 4 and 6, project in a horizontal series between the discharge end of the carrier belt A and the receiving end of the retarder apron F and their function is to stir from underneath the cut bundle as it is falling and while being spread open at the top, by spreader D. The loosening fingers are, see Figs. 6 and 3, short rock shafts journaled in a stationary bar $e^3$ and have cranked front and rear ends and the rear cranks enter holes in a reciprocating bar $e^4$ so that as this bar reciprocates the fingers are oscillated laterally to tear apart and loosen up the straw of the bundles. To reciprocate bar $e^4$, see Fig. 4, it is connected to a crank pin $e^5$ on a bevel wheel $e^6$. This bevel wheel meshes with a bevel wheel $e^7$ at right angles to it. Bevel wheel $e^7$, see Fig. 9, is rigid with a straight toothed gear $E^2$ which meshes with a straight toothed gear E' above and a straight toothed gear $E^3$ below. The intermediate straight toothed gear $E^2$ is rigid with the sprocket wheel $e^2$ which receives power from the chain belt $e'$, as seen Fig. 2. This description it will be seen traces the path of the transmission of power through the driving mechanism for the loosening teeth and the same gear $E^2$, see Fig. 9, meshing with gear E' above turns the roller A' on whose shaft it is mounted and this roller A', see Fig. 4, is the inner driving roller for the carrier belt. The shaft of the driving rollers is made in two parts with a universal joint A² between them so as to allow these rollers to accommodate themselves to the angular relation of the two carrier belts and still be driven by one driving mechanism at one end.

Referring again now to Fig. 9, the intermediate driving gear E² in meshing with the gear E³ below it, turns the roller F', which is mounted on the same shaft with gear E³, and this roller F' is, see Fig. 3, the driving roller for the retarder apron F. This retarder apron is covered with projecting teeth or blades $f$, see Fig. 7, and may be either a flexible apron or slats connected at the ends by links or chains passing around sprocket wheels or any other similar construction. The upper ends of the teeth $f$ are inclined backward, away from the delivery end of the machine and they are so arranged that as they slowly advance toward the threshing cylinder the grain will pile up thereagainst in a more or less uniform layer before passing to the threshing cylinder.

Just below the retarder apron F is a chaff and grain board H, Fig. 3, on which the shattered grain falls that sifts out before reaching the cylinder. This grain board at its forward end extends to the cylinder throat and at its rear end is hinged at $h$ to a fan case which has a fan G that delivers a blast over the grain board and blows the grain and detached heads and chaff into the cylinder. This fan is driven, see Fig. 1, by a pulley $g$ and a crossed belt $g'$ from a pulley $g^2$ on the end of the band cutter shaft $c$.

In order to give access to the front of the threshing cylinder it is desirable that the grain board H and retarder apron F be gotten out of the way, for this purpose. To accomplish this, the grain board H, see Fig. 3, is drawn back and turned about its hinge $h$ to a pendent position, as in dotted lines, and the retarder apron F is also turned down about the axis of its roller F' as indicated in dotted lines. For the latter purpose the sides of the casing are formed with curved slots $y$ and a lever $y^2$ is fulcrumed on each side of the casing and has an elbow $y^3$ that passes through the curved slots $y$ and connects with the frame of the retarder apron, a notched arc bar $y'$ and spring locking bolt $y^4$ serving to hold the retarder to any desired adjustment as to elevation and thereby also allowing the retarder to have a greater or less retarding effect according to the angular position which it occupies.

I claim

1. In a threshing machine feeder comprising two bundle carrier belts set at an angle converging toward each other at their delivery ends and approaching to close juxtaposition and having at their outer ends, which are widest apart, two vertical endless aprons set between the carrier belts and gears for driving the carrier belts and aprons to advance the bundles, the outer sides of the carrier belts being open.

2. A threshing machine feeder comprising two bundle carrier belts set at an angle converging toward each other at their delivery ends and approaching to close juxtaposition, driving shafts and rollers arranged at the delivery ends, vertical endless aprons set between the outer divergent ends of the two carrier belts, gears for the same, and a vertical stationary board extending from the inner end of each of the vertical aprons to the delivery ends of the carrier belts.

3. A threshing machine feeder comprising a bundle carrier belt, a rotary cutter, a rotary spreader with alternately reversed deflected blades located above the delivery end of the belt, a continuously rotating retarder apron with upwardly projecting teeth arranged below the delivery end of the bundle carrier and a series of horizontal and laterally oscillating fingers projecting from below the bundle carrier belt and over the retarder apron.

4. In a threshing machine feeder, the combination with the bundle carrier belt, of a series of horizontal and oscillating fingers projecting rearwardly from below the belt, a transverse bearing bar for the fingers, each of said fingers being made as a double cranked rock-shaft journaled in the bearing bar, a connecting rod connecting the rear cranks of the fingers and gears for reciprocating said connecting rod.

Witnessed March 7", 1906.

DANIEL McIVOR.

Witnesses:
JAMES E. MONTAGUE,
L. J. WELLING.